(12) United States Patent
Deng

(10) Patent No.: US 9,502,993 B2
(45) Date of Patent: Nov. 22, 2016

(54) METHOD AND APPARATUS FOR SENSING SIGNALS

(75) Inventor: Ken Kan Deng, Gaithersburg, MD (US)

(73) Assignee: ION GEOPHYSICAL CORPORATION, Houston, TX (US)

( * ) Notice: Subject to any disclaimer, the term of this patent is extended or adjusted under 35 U.S.C. 154(b) by 316 days.

(21) Appl. No.: 13/984,266

(22) PCT Filed: Feb. 7, 2012

(86) PCT No.: PCT/US2012/024173
§ 371 (c)(1),
(2), (4) Date: Aug. 7, 2013

(87) PCT Pub. No.: WO2012/109266
PCT Pub. Date: Aug. 16, 2012

(65) Prior Publication Data
US 2013/0319118 A1    Dec. 5, 2013

Related U.S. Application Data

(60) Provisional application No. 61/462,617, filed on Feb. 7, 2011, provisional application No. 61/462,656, filed on Feb. 7, 2011.

(51) Int. Cl.
*G01P 15/125* (2006.01)
*H02N 1/00* (2006.01)
(Continued)

(52) U.S. Cl.
CPC .............. *H02N 1/006* (2013.01); *G01H 11/08* (2013.01); *G01P 15/09* (2013.01);
(Continued)

(58) Field of Classification Search
CPC .. G01P 15/125; G01P 15/0802; G01P 15/02; G01P 15/13; G01P 15/131
USPC ............................ 73/514.32, 514.38, 514.36
See application file for complete search history.

(56) References Cited

U.S. PATENT DOCUMENTS

| 4,075,525 A | 2/1978 | Birchall |
| 4,327,350 A | 4/1982 | Erichsen |

(Continued)

FOREIGN PATENT DOCUMENTS

| CN | 101038298 A | 9/2007 |
| CN | 101426163 A | 5/2009 |

(Continued)

OTHER PUBLICATIONS

A Bakker, et al, "A CMOS Nested-Chopper Instrumentation Amplifier with 100nV Offset", IEEE Journal Solid-State Circuits, vol. 35, No. 12, Dec. 2000.

(Continued)

*Primary Examiner* — Helen Kwok
(74) *Attorney, Agent, or Firm* — Dorsey & Whitney LLP

(57) ABSTRACT

Methods, apparatuses, and systems are disclosed for a transducer. The transducer can include a bottom plate formed from a first sheet of material, a top plate formed from a second sheet of material, and a middle portion. The middle portion includes a mid-upper element formed from a third sheet of material, with a mid-upper frame, a mid-upper mass, and a plurality of mid-upper attachment members coupling the mid-upper mass to the mid-upper frame. The middle portion can also include a central element formed from a fourth sheet of material, with the central element having a central frame and a central mass.

21 Claims, 12 Drawing Sheets

(51) Int. Cl.

| | | |
|---|---|---|
| *G01H 11/08* | (2006.01) | |
| *G01P 15/09* | (2006.01) | |
| *G01P 15/12* | (2006.01) | |
| *G01P 15/18* | (2013.01) | |
| *G01V 1/18* | (2006.01) | |
| *G01V 13/00* | (2006.01) | |
| *G01V 1/38* | (2006.01) | |
| *G01P 15/08* | (2006.01) | |

(52) U.S. Cl.
CPC ........ *G01P 15/0915* (2013.01); *G01P 15/123* (2013.01); *G01P 15/125* (2013.01); *G01P 15/18* (2013.01); *G01V 1/18* (2013.01); *G01V 13/00* (2013.01); *G01P 2015/0805* (2013.01); *G01P 2015/0828* (2013.01); *G01V 1/38* (2013.01); *Y10T 29/49005* (2015.01)

(56) References Cited

U.S. PATENT DOCUMENTS

| | | | |
|---|---|---|---|
| 4,908,921 A | 3/1990 | Chen et al. | |
| 4,930,042 A * | 5/1990 | Wiegand | G01P 1/003 |
| | | | 361/280 |
| 5,000,817 A | 3/1991 | Aine | |
| 5,121,180 A | 6/1992 | Beringhause et al. | |
| 5,335,544 A | 8/1994 | Wagner et al. | |
| 5,383,364 A * | 1/1995 | Takahashi | G01P 15/18 |
| | | | 361/280 |
| 5,406,531 A | 4/1995 | Henriquez et al. | |
| 5,484,073 A | 1/1996 | Erickson | |
| 5,616,844 A * | 4/1997 | Suzuki | G01P 1/023 |
| | | | 73/493 |
| 5,777,226 A | 7/1998 | Ip | |
| 6,026,690 A | 2/2000 | Nakagawa et al. | |
| 6,082,197 A | 7/2000 | Mizuno et al. | |
| 6,105,427 A * | 8/2000 | Stewart | G01P 15/0802 |
| | | | 361/280 |
| 6,196,067 B1 * | 3/2001 | Martin | G01P 15/0802 |
| | | | 73/514.32 |
| 6,263,735 B1 * | 7/2001 | Nakatani | G01P 15/0802 |
| | | | 73/514.32 |
| 6,715,363 B1 | 4/2004 | Deng et al. | |
| 6,805,008 B2 * | 10/2004 | Selvakumar | G01P 15/0802 |
| | | | 73/504.14 |
| 6,861,587 B1 | 3/2005 | SelVakumar et al. | |
| 6,871,554 B2 | 3/2005 | Duret et al. | |
| 6,883,638 B1 | 4/2005 | Maxwell et al. | |
| 6,945,110 B2 | 9/2005 | Selvakumar et al. | |
| 6,981,416 B2 * | 1/2006 | Chen | G01P 15/18 |
| | | | 73/510 |
| 7,066,026 B2 | 6/2006 | Deng | |
| 7,104,140 B2 | 9/2006 | Zou et al. | |
| 7,137,300 B2 * | 11/2006 | Aoyagi | G01P 15/125 |
| | | | 361/280 |
| 7,152,473 B1 | 12/2006 | Rushefsky et al. | |
| 7,236,279 B2 | 6/2007 | Yu et al. | |
| 7,274,079 B2 | 9/2007 | Selvakumar et al. | |
| 8,544,325 B2 * | 10/2013 | Ackerley | G01V 1/181 |
| | | | 73/514.01 |
| 2002/0178817 A1 | 12/2002 | Selvakumar et al. | |

| | | |
|---|---|---|
| 2003/0020377 A1 | 1/2003 | Namerikawa et al. |
| 2004/0020292 A1 | 2/2004 | Deng |
| 2005/0056096 A1 | 3/2005 | Ozawa et al. |
| 2005/0057123 A1 | 3/2005 | Deng |
| 2005/0134149 A1 | 6/2005 | Deng et al. |
| 2005/0248235 A1 | 11/2005 | Namerikawa et al. |
| 2007/0107521 A1 | 5/2007 | Yasuda et al. |
| 2007/0119259 A1 | 5/2007 | Zou et al. |
| 2008/0184787 A1 | 8/2008 | Coates |
| 2010/0194407 A1 | 8/2010 | Nakatani |
| 2010/0281979 A1 | 11/2010 | McConnell et al. |
| 2011/0033062 A1 | 2/2011 | Deng |

FOREIGN PATENT DOCUMENTS

| | | |
|---|---|---|
| CN | 101475138 | 7/2009 |
| CN | 101792110 A | 8/2010 |
| CN | 101858929 A | 10/2010 |
| DE | 10260087 A1 | 7/2004 |
| EP | 1348967 | 10/2003 |
| EP | 1953499 A2 | 8/2008 |
| GB | 2174500 A | 11/1986 |
| GB | 2444373 A | 6/2008 |
| JP | 10-136665 A | 5/1998 |
| JP | 2000275272 A | 10/2000 |
| JP | 2008-107257 | 5/2008 |
| RU | 1647409 A1 | 1/1989 |
| WO | 8702467 | 4/1987 |
| WO | 8900294 | 1/1989 |
| WO | 9100522 | 1/1991 |
| WO | 2007095360 A2 | 8/2007 |
| WO | 2012/109259 | 8/2012 |
| WO | 2012109259 A2 | 8/2012 |

OTHER PUBLICATIONS

J. Wu, et al, "A Low-Noise Low-Offset Capacitive Sensing Amplifier for a 50 ug/rt Hz Monolithic CMOS MEMS Accelerometer", IEEE Journal Solid-State Circuits, vol. 39, No. 5, May 2004.

M. Trindade et al, "On high order modeling of smart beams with embedded shear-mode piezoceramic actuators and sensors", Mechanics of Advanced Materials and Structures, 13(5), pp. 357-369, 2006.

H Sun, et al, "A Low-Power Low-Noise Dual-Chopper Amplifier for Capacitive CMOS-MEMS Accelerometers", IEEE Sensors Journal, vol. 11, No. 4, Apr. 2011.

EoPlex Technologies, "Miniature Low Cost Ceramic, Metal and Polymer Parts", http://www.eoplex.com, date unknown.

International Search Report and Written Opinion, PCT/US2012/024173, Apr. 2013, 20 pages.

International Search Report and Written Opinion, PCT/US2012/024165, Apr. 2013, 19 pages.

Denmark Patent and Trademark Office Search Report for Patent App. No. PA 201370430, completed Feb. 4, 2014.

"First Technical Examination and Search Report", issued in Danish Application No. PA 2015 70277 on Jun. 29, 2015, 7 pages.

"Search Report issued Jul. 23, 2015, in Chinese Application No.", 201280016682.4, 3 pages.

"Search Report issued Oct. 29, 2015, in Chinese Application No. 201280016638.3, 2 pages".

* cited by examiner

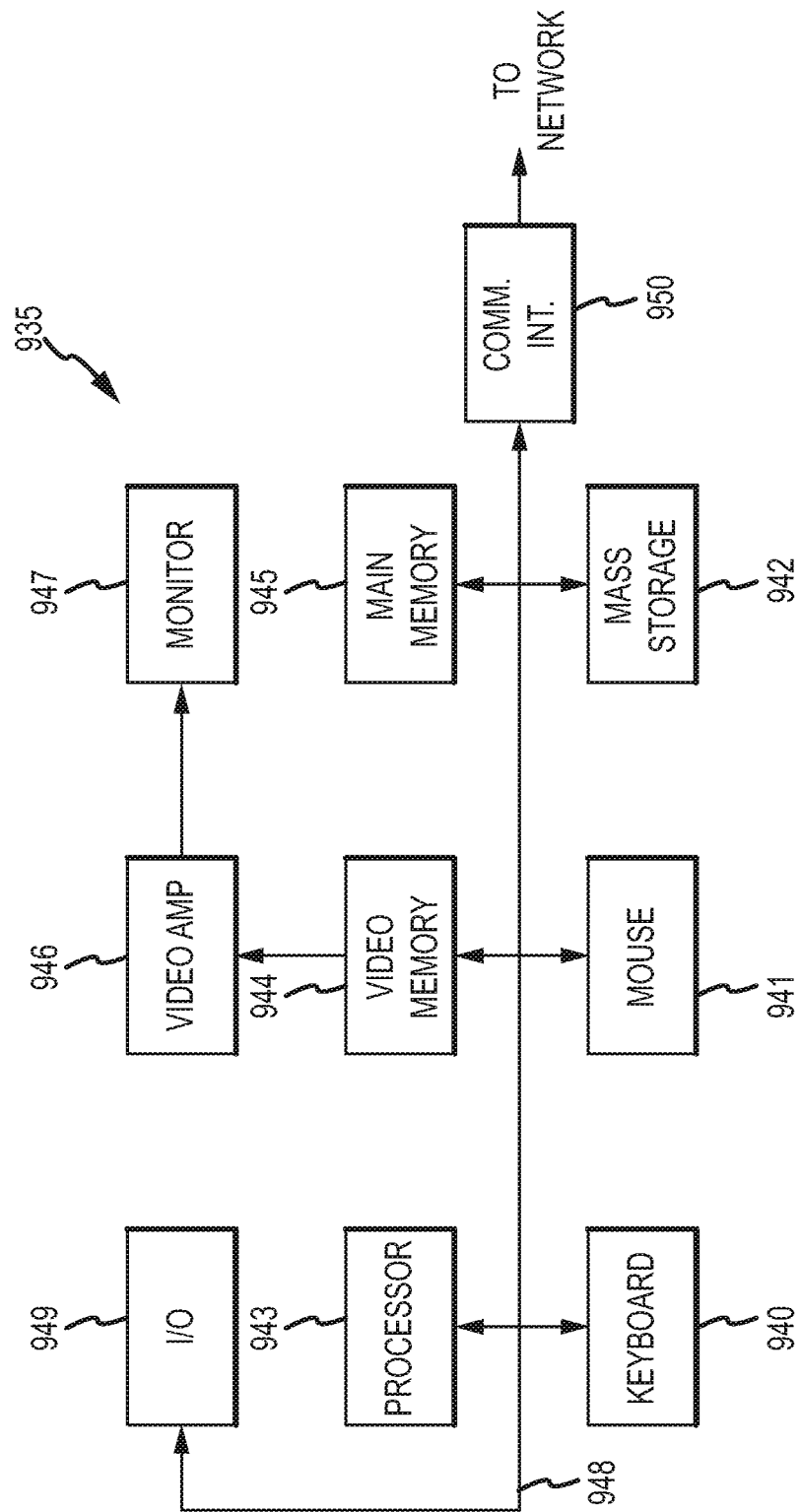

METHOD AND APPARATUS FOR SENSING SIGNALS

This application claims priority to PCT application No. PCT/US2012/024173 entitled "METHOD AND APPARATUS FOR SENSING UNDERWATER SIGNALS" filed on Feb. 7, 2012, and also to U.S. provisional application No. 61/462,617 entitled "An Underwater Vector Sensor by Using Batch Fabricated Precision Capacitive Accelerometer" filed on Feb. 7, 2011, and also to U.S. provisional application No. 61/462,656 entitled "Underwater Vector Sensor by Using Piezoelectric Flexible Shear Mode Sensor" also filed on Feb. 7, 2011, all of which are incorporated herein by reference in their respective entireties.

TECHNICAL FIELD

This disclosure relates generally to transducers, and more particularly to transducers for use in sensing underwater signals such as acoustic signals.

BACKGROUND

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers (which may each include one or more transducers used as sensors, for example, an accelerometer, a hydrophone, etc.). By observing the reflected seismic signals detected by the receiver during the survey, the geophysical data pertaining to reflected signals may be acquired and these signals may be used to form an image indicating the composition of the Earth near the survey location.

Conventional receivers may include one or more transducers used as accelerometers to measure vibrations, particle motion, acceleration, and so forth. For example, a 3-dimensional receiver may include three orthogonally oriented transducers. Each transducer may be, for example, a microelectromechanical (MEMS) capacitive accelerometer. MEMS capacitive accelerometers can be complicated and expensive to manufacture due to the silicon fabrication and processing techniques used, as well as the complex packaging required to hermetically seal the MEMS components. Also delicate electrical connections may need to be made to the MEMS components, which can be difficult and not always successful. Further, most MEMS capacitive accelerometers have a relatively small mass, which may be disadvantageous for applications where a relatively high sensitivity, low noise transducer is needed. Accordingly, relatively high sensitivity, low noise transducers that are inexpensive and relative easy to manufacture are needed.

BRIEF DESCRIPTION OF THE DRAWINGS

FIG. 9 illustrates an embodiment of a computer system capable of storing and/or processing navigation and seismic data received from one or more transducers, such as to determine the acoustic acceleration of a body in at least one directional component.

DETAILED DESCRIPTION

Described herein are transducers that can be made from readily available materials at low cost and that can be used for sensing underwater acoustic signals, among other applications. The transducers described herein may include a relatively large mass, and may be able to have either of two orientations relative to gravity.

Figure 1:
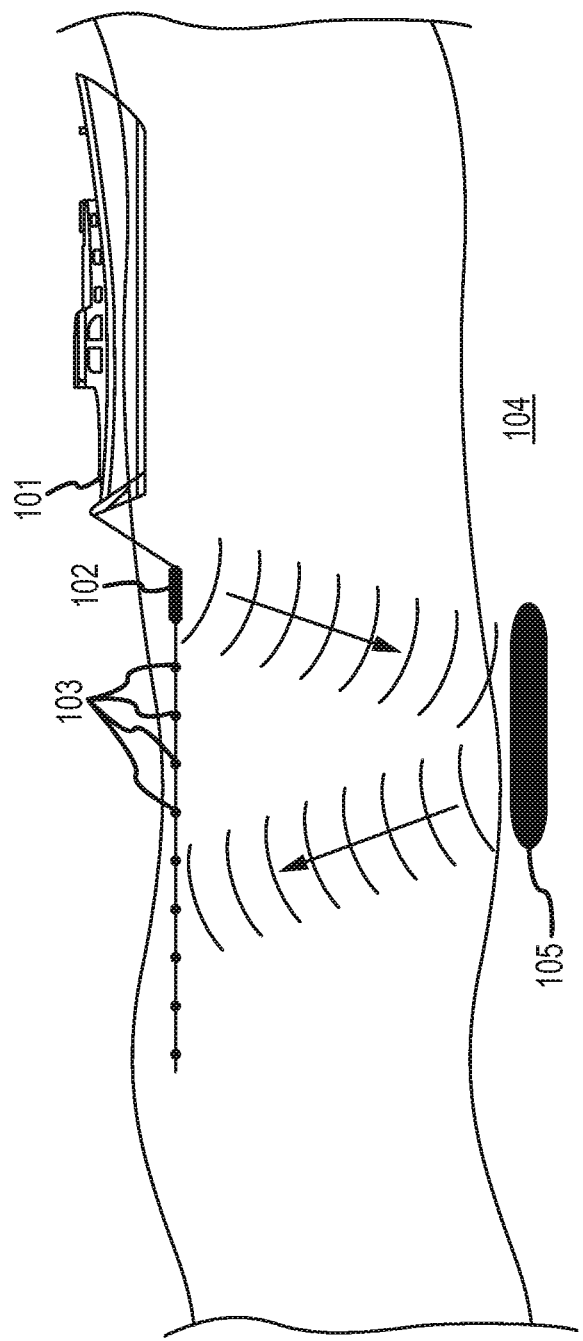
FIG. 1 illustrates a side view of a vessel towing a seismic source and a plurality of seismic receivers positioned on streamers towed behind the vessel.

FIG. 1 shows a side view of a vessel 101 towing a source 102 and several receivers 103 on streamers behind the vessel 101. As is shown, the receivers 103 may be positioned just beneath the surface of the water. For the sake of discussion, the embodiment depicted in FIG. 1 illustrates the source and receiver being towed by the same vessel, however other combinations are possible. For example, in other embodiments, either the source and/or receivers may be towed by separate vessels or may be implemented in land-based acquisition systems. In still other embodiments, the source and/or receivers may be stationary while the other is towed behind the vessel. In yet other embodiments, the receivers 103 may be positioned deeper in the water, for example, by using streamer steering devices, such as the DigiBIRD® and DigiFIN® brand steering devices available from ION Geophysical Corporation. In other embodiments, multiple sources may be used. Also, any type of source(s) or receiver (s) may be used, including for example, 1-, 2-, or 3-dimensional sources or receivers.

During operation, the source 102 may emit seismic energy (e.g., by an air gun), which may reflect off various portions of the Earth 104 and may be received back at the receivers 103 (as shown by the propagating seismic waves in FIG. 1). As will further be described below, each receiver 103 may include one or more transducers (not specifically shown in FIG. 1) used as accelerometers to measure the magnitude and direction of the reflected seismic energy. The receivers may further include other sensors and/or transmitting devices, such as a pressure sensor or a microphone. The signal received and processed at the receivers 103 may provide data that is useful in determining the composition of various portions of the Earth 104 proximate the location where the signal was reflected, which may include an oil and/or gas reservoir 105. If the amount of oil and/or gas in the reservoir 105 is depleted over time, then subsequent surveys conducted in substantially the same location as the first survey may indicate various properties of this depletion such as: decreasing pore pressures, migration of oil/water and/or gas/water contacts, drop in acoustic impedance, and so forth.

Figure 2:
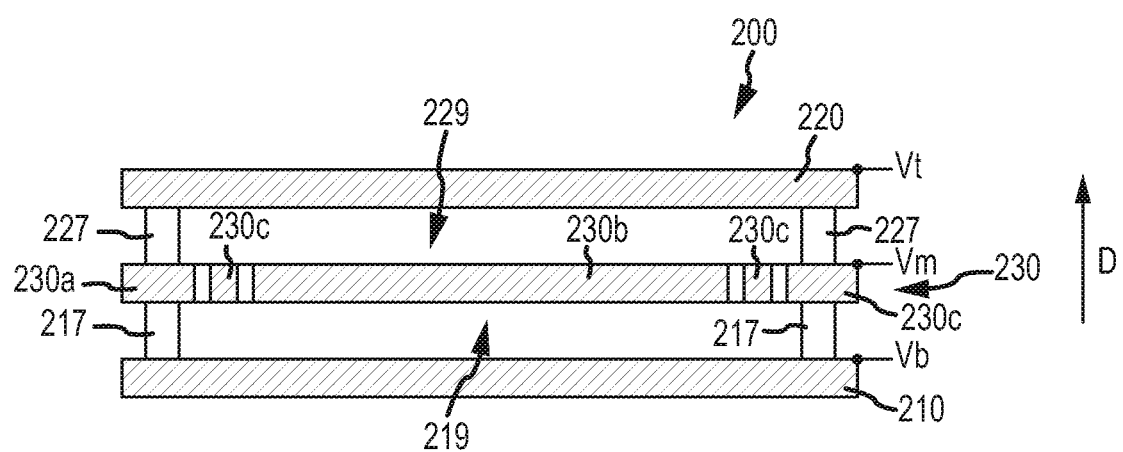
FIG. 2 illustrates a cross-sectional view of an embodiment of a transducer.

FIG. 2 illustrates a cross-section view of one embodiment of a transducer 200 that may be used, for example, as a single-axis, capacitive accelerometer in the receivers 103 illustrated in FIG. 1 (and which may be combined with other transducers 200 to form a tri-axial accelerometer or vector sensor in some embodiments), although the transducer 200 illustrated in FIG. 2 may be used in other applications as well. The transducer 200 includes a bottom plate 210 formed from a first sheet of material and a top plate 220 formed from a second sheet of material. As described in more detail, a plurality of bottom plates 210 may be formed in an array on the first sheet of material, and a plurality of top plates 220 may be formed in an array on the second sheet of material.

The first sheet of material, from which the bottom plate 210 is formed, may be a metal material in some embodiments, such as stainless steel, aluminum, copper, and so forth. It may also be an alloy comprised of a plurality of types of metals. In other embodiments, the first sheet of material may be a ceramic material that has been coated or plated with a metal or other conductive layer on at least one surface. In some embodiments, the first sheet of material is not a semiconductor material, such as silicon. The bottom plate 210 formed from the first sheet of material may be one of many different shapes, such as a generally circular shape, a generally square shape, an octagon shape, an asymmetrical shape, and so forth. The diameter of the bottom plate 210 may be approximately 1 cm in some embodiments, although in other embodiments it may be smaller or larger.

The second sheet of material, from which the top plate 220 is formed, may be the same type of material as the first sheet of material in some embodiments, but in other embodiments, it may be a different type of material. Generally, the second sheet of material may be metal, ceramic, and so forth. The top plate 220 formed from the second sheet of material may be one of many different shapes, such as a generally circular shape, a generally square shape, an octagon shape, an asymmetrical shape, and so forth. In some embodiments, the top plate 220 may be the same shape as the bottom plate 210. The diameter of the top plate may be approximately 1 cm in some embodiments, although in other embodiments it may be smaller or larger.

Each of the first and second sheets of material may be, for example, between 0.001" and 0.040" thick, although in some embodiments, the thickness may be more or less than 0.001" and 0.040".

The transducer 200 also includes a middle portion 230 formed, for example, from a third sheet of material. The third sheet of material may be the same type of material as the first and second sheets of material in some embodiments, but in other embodiments it may be a different type of material. Generally, the third sheet of material may be metal, ceramic (which may be plated or coated with a layer of metal), and so forth.

The middle portion 230 includes a frame 230a, a mass 230b, and a plurality of attachment members 230c that couple the mass 230b to the frame 230a and that may provide relative movement between the mass 230b and the frame 230a. The attachment members 230c may function as springs in some embodiments. In general, the middle portion 230 may include 2, 3, 4, 6, 8, or any other number of attachment members 230c. Further, in some implementations, the number of attachment members 230c may be odd, such as 3, 5, 7, etc. In some embodiments, the frame 230a, the mass 230b and the plurality of attachment members 230c may be formed from the same sheet of material (e.g., the third sheet of material), which, if conductive, may allow the frame to be electrically coupled to the mass. As described in more detail, a plurality of middle portions 230 may be formed in an array on the third sheet of material.

The middle portion 230, including the frame 230a, the mass 230b, and the attachment members 230c, may individually and collectively be any of a number of different shapes. For example, the frame 230a of the middle portion 230 may be shaped similar to the top and/or bottom plates 220, 210, and the mass 230b may be shaped similar to, but smaller than, the top and/or bottom plates 220, 210. In some embodiments, the top and bottom sheets 220, 210, the frame 230a, and the mass 230b may all be generally circularly shaped. The attachment members 230c may be, for example, serpentine shaped support arms in some embodiments. The total diameter of the middle portion 230 (including the frame 230a, the attachment members 230c, and the mass 230b) may be approximately 1 cm in some embodiments, although in other embodiments it may be smaller or larger. Also, the thickness of the middle portion 230 may be, for example, between 0.001" and 0.080" thick, although in some embodiments, the thickness may be more or less than 0.001" and 0.080".

The frame 230 of the middle portion 230 is coupled to the top and bottom plates 220, 210. For example, the frame 230a may be coupled to the top plate 220 through a first coupling layer 227, and the frame 230a may be coupled to the bottom plate 210 through a second coupling layer 217. The first and second coupling layers 227, 217 may include a non-conductive layer, such as a dielectric layer. The coupling layers 227, 217 may additionally or alternatively include a bonding agent or adhesive that helps couple the middle portion 230 to the top and bottom plates 220, 210.

In some embodiments, a first surface of the frame 230a may be coupled to the top plate 220 such that a first capacitance 229 is provided between the mass 230b and the top plate 220, and a second surface of the frame 230 may be coupled to the bottom plate 210 such that a second capacitance 219 is provided between the mass 230b and the bottom plate 210. The capacitances 219, 229 may result from respective capacitance gaps between the mass 230b and the respective top and bottom plates 220, 210, if, for example the first and second coupling layers 227, 217 provide a dielectric layer between the middle portion 230 and the top and bottom plates 220, 210. In general, the thickness of the first and second coupling layers 227, 217 may define the height of the capacitance gaps, which may be, for example, between 2 and 50 microns, although in some embodiments, the height may be more or less than 2 and 50 microns.

A first electrical connection Vt may be provided to the top plate 220, a second electrical connection Vm may be provided to the mass 230b of the middle portion 230, and a third electrical connection Vb may be provided to the bottom plate 210. If each of the top plate 220, the middle portion 230, and the bottom plate 210 are made from a conductive sheet of material (e.g., stainless steel), the electrical connections Vt, Vm, and Vb may be made, for example by soldering or welding a connection wire to the respective top plate 220, the frame 230a of the middle portion 230 (which may be electrically coupled to the mass 230b, as described above), and the bottom plate 210. In other embodiments, the connections Vt, Vm, and Vb may be formed as an extension of the plates 210, 220, and 230 themselves. If a voltage potential is applied across the electrical connections Vt and Vb, a voltage measured on the electrical connection Vm may be proportional to the distances between the mass 230b and the top and bottom plates 220, 210 because the first and second capacitances 229, 219 share a common node (i.e., the mass 230b).

The transducer 200 illustrated in FIG. 2 may measure acceleration due to the mass 230 moving relative to the top and bottom plates 220, 210. For example, when the transducer 200 is accelerated in a direction D, the mass 230b may move closer to the bottom plate 210 and further away from the top plate 220 (as compared to the position of the mass 230b when the transducer 200 is at rest). The movement of the mass 230b may cause the voltage measured on the electrical connection Vm to change linearly with the displacement of the mass 230b from its at-rest position, which can be used to determine the rate of acceleration of the transducer 200. The voltage measured on the electrical connection Vm may be provided to a circuit for processing, such as a low noise voltage amplifier, a high pass filter, a low pass filter, and so forth. The processing may help remove the DC offset from the measured signal is some embodiments, and may also or alternatively help remove noise, and so forth. Furthermore, the processing circuitry may be used to electrically bias the transducer 200 in a given direction to accommodate gravitational forces. For example, if the transducer 200 is implemented such that the middle mass 230b is offset from the bottom plate 210 and the top plate 220 with respect to gravity, then the top and bottom capacitances 219, 229 may be different, and an electric potential may be applied to the capacitances to nullify this offset.

The frame 230a of the middle portion 230 may form at least a part of a casing for the transducer 200. The top and bottom plates 220, 210 may also form a part of the casing for the transducer 200 in some embodiments. Because the frame 230a forms at least a part of the casing for the transducer, and because the electrical connections Vt, Vm, and Vb can be made by soldering a connection wire to the top plate 220, the frame 230a of the middle portion 230, and the bottom plate 210, the transducer 200 may not need additional packaging (such as a vacuum package, a hermetic package, an electrical connection package, and so forth) before it can be mounted or used in a particular application. In other words, the top plate 220, the middle portion 230, and the bottom plate 210 may integrally include both the structural and the electrical packaging for the transducer 200. As such, manufacturing costs may be reduced as compared with conventional transducers that require separate structural and/or electrical packaging.

Figure 3A:
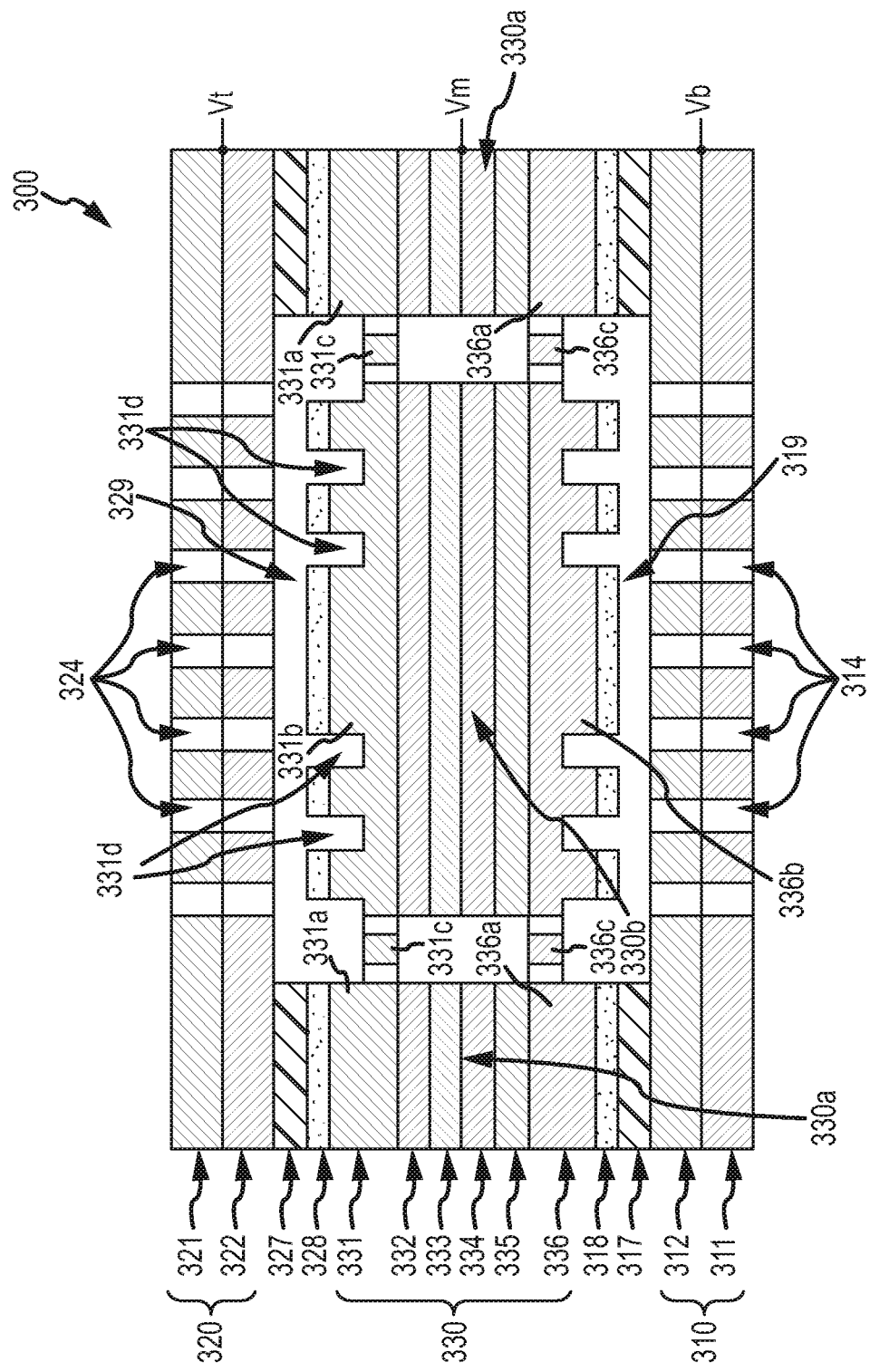
FIG. 3A illustrates a cross-sectional view of another embodiment of a transducer.

FIG. 3A illustrates a cross-section view of a second embodiment of a transducer 300, which, in some embodiments, may be similar to the transducer 200 illustrated in FIG. 2. The transducer 300 illustrated in FIG. 3A includes a bottom plate 310, a top plate 320, and a middle portion 330.

The top plate 320 may be formed from one or a plurality of sheets of material, and the bottom plate 310 may also be formed from one or a plurality of sheets of material. As described in more detail below, a plurality of top plates 320 may be formed together in an array, and a plurality of bottom plates 310 may be formed together in an array. As illustrated in FIG. 3A, the top plate 320 is formed from two sheets of material 321, 322, and the bottom plate 310 is also formed from two sheets of material 311, 312. As described in more detail below, the two sheets 321, 322 that form the top plate 320 may be coupled together through a process such as thermal diffusion bonding, and the two sheets 311, 312 that form the bottom plate 310 may be similarly coupled in some embodiments. Of course, the top and bottom plates 320, 310 may be formed from less than two sheets (i.e., from a single sheet) or may be formed from more than two sheets depending upon the actual implementation.

The top plate 320 may also have one or more perforations 324 formed in the sheet or sheets of material 321, 322 from which it is formed. Similarly, the bottom plate 310 may have one or more perforations 314 in the sheet or sheets of material 311, 312 from which it is formed. The perforations 314, 324 may help reduce air damping when the mass 330b (described in more detail below) moves relative to the top and bottom plates 320, 310. The perforations 314, 324 may help reduce air damping because they provide a passage for air to pass through when the mass 330b moves relative to the top and bottom plates 320, 310. The perforations 314, 324 may also increase the capacitive sensitivity of the transducer 300 due to an electrostatic fringe effect. The additional capacitance introduced by the fringe effect may be 5% to 20% depending on the design. However, in some embodiments, the top and/or bottom plate may not have any perforations.

The middle portion 330 may be formed from one or more sheets of material. For example, as illustrated in FIG. 3A, the middle portion 330 includes a mid-upper element 331 formed from a sheet of material, a plurality of central elements 332, 333, 334, 335, each formed from a sheet of material, and a mid-lower element 336 formed from a sheet of material.

The mid-upper element 331 includes a frame 331a, a mass 331b, and a plurality of attachment members 331c that couple the mass 331b to the frame 331a and that may provide relative movement between the mass 331b and the frame 331a. In general, the mid-upper element 331 may include a plurality of attachment members 331c. The frame 331a, the mass, 331b, and the plurality of attachment members 331c may be formed from the same sheet (or sheets) of material, which may be conductive and thereby couple the frame 331a to the mass 331b via the attachment members 331c. The mid-upper element 331 also may include grooves 331d in some but not all embodiments, which may be formed by etching (e.g., chemical photolithographical etching). The grooves 331d may help reduce air damping because they may provide a passage for air to pass through when the mass 330b moves relative to the top and bottom plates 320, 310. Alternatively, or in addition to the grooves 331d, the frame 331a of the mid-upper element 331 may include side-vent openings (not shown) through which air can pass when the mass 330b moves relative to the top and bottom plates 320, 310.

The mid-lower element 336 includes a frame 336a, a mass 336b, and a plurality of attachment members 336c that couple the mass 336b to the frame 336a and that may provide relative movement between the mass 336b and the frame 336a. In general, the mid-lower element 336 may include a plurality of attachment members 336c. It should be appreciated that while the attachment members 336c and/or 331c are illustrated in the cross section of FIG. 3A as implemented in pairs, i.e., two on each side, other embodiments are possible where no pairing is present. For example, in some embodiments, the mid-upper element 331 may include a single attachment member 331c while the mid-lower element 336 may include a pair of attachment members 336c, or vice versa. The frame 336a, the mass, 336b, and the plurality of attachment members 336c may be formed from the same sheet (or sheets) of material, which may be conductive and thereby couple the frame 336a to the mass 336b via the attachment members 336c. The mid-lower element 336 also may include grooves in some but not all embodiments. The grooves may help reduce air damping because they may provide a passage for air to pass through when the mass 330b moves relative to the top and bottom plates 320, 310. Alternatively, or in addition to the grooves, the frame 336a of the mid-lower element 336 may include side-vent openings (not shown) through which air can pass when the mass 330b moves relative to the top and bottom plates 320, 310.

Each of the central elements 332, 333, 334, 335 includes a frame and a mass. The central elements 332, 333, 334, 335 illustrated in FIG. 3A do not include attachment members coupling the mass to the frame. However, in other embodiments, one or more of the central elements 332, 333, 334, 335 may each include one or more attachment members (not shown). The frame and the mass for each of the central elements 332, 333, 334, 335 may be formed from the same sheet (or sheets) of material, which may be conductive in some embodiments. It should be appreciated that each of the central elements 332, 333, 334, 335 may be manufactured using different types of materials, which may allow the mass 330b to have different dynamic characteristics.

The frame 331a of the mid-upper element, the frames of each of the central elements, and the frame 336a of the mid-lower element may all be coupled together (as described in more detail below) and may together form the frame 330a of the middle portion 330. Similarly, the mass 331b of the mid-upper element, the masses of each of the central elements, and the mass 336b may be coupled together (as described in more detail below) and may together form the mass 330b of the middle portion 330.

The frame 330a of the middle portion 330 is coupled to the top and bottom plates 320, 310. As illustrated in FIG. 3, the frame 330a is coupled to the top plate 320 through a dielectric layer 328 and a bonding layer 327. The dielectric layer 328 may be a non-conductive and/or insulative material (such as parylene), and the bonding layer 327 may include for example an adhesive or a bonding agent. Also, as illustrated in FIG. 3A, the dielectric layer 328 may cover at least portions of the mass 331b of the mid-upper element 331, for example the portions other than the grooves 331d. In other embodiments, the dielectric layer 328 may also cover the grooves 331d and/or the attachment members 331c. The dielectric layer 328 may serve to prevent the mass 331b of the mid-upper element 331 from touching the top plate 320 and thereby prevent a conductive path therebetween. The dielectric layer 328 may also serve to decouple the top plate 320 from the frame 330a of the middle portion so that there is not a conductive path therebetween and in order to form the capacitance 329 between the top plate 320 and the mass 330b. In general, the thickness of the dielectric layer 328 and the bonding layer 327 may determine the thickness of the capacitance 329 gap between the top plate 320 and the mass 330b.

The frame 330a of the middle portion 330 is also coupled to the bottom plate 310 through a dielectric layer 318 and a bonding layer 317. The dielectric layer 318 may be a non-conductive and/or insulative material (such as parylene), and the bonding layer 317 may include for example an adhesive or a bonding agent. Also, as illustrated in FIG. 3A, the dielectric layer 318 may cover at least portions of the mass 336b of the mid-lower element 331, for example the portions other than the grooves. In other embodiments, the dielectric layer 318 may also cover the grooves and/or the attachment members 336c. The dielectric layer 318 may serve to prevent the mass 336b of the mid-lower element 336 from touching the top plate 320 and thereby provide a conductive path therebetween. The dielectric layer 318 may also serve to decouple the bottom plate 310 from the frame 330a of the middle portion so that there is not a conductive path therebetween and in order to form the capacitance 319 between the bottom plate 310 and the mass 330b. In general, the thickness of the dielectric layer 318 and the bonding layer 317 may determine the thickness of the capacitance 319 gap between the bottom plate 310 and the mass 330b. It should be appreciated that although the illustrated embodiment shows the capacitances 319, 329 as substantially symmetrical in terms of capacitance gap and/or thickness of bonding layers 317, 327, other embodiments are possible where the capacitances 319, 329 are asymmetrical.

Figure 3B:
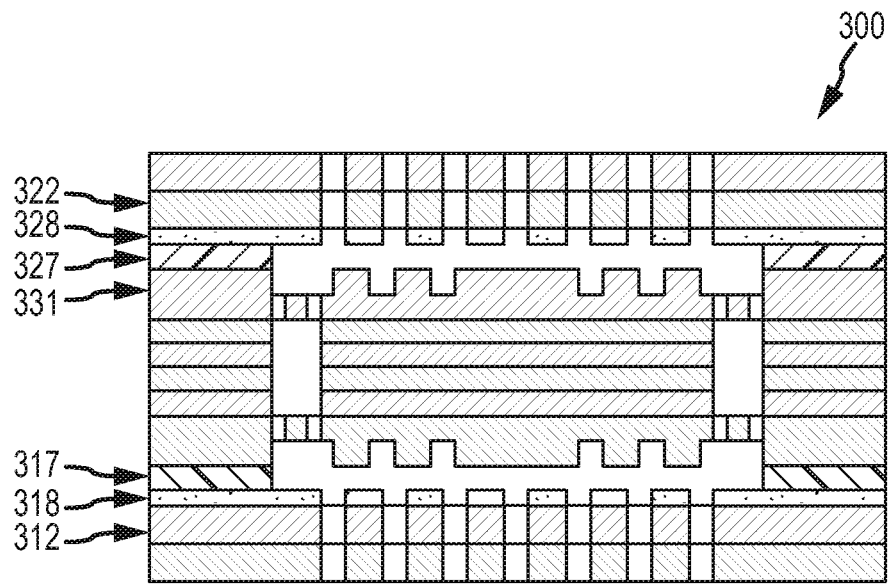
FIG. 3B illustrates a cross-sectional view of another embodiment of a transducer.

FIG. 3B illustrates a cross-section view of a third embodiment of a transducer 300, which may be similar to the transducer 300 illustrated in FIG. 3A, except that the transducer 300 illustrated in FIG. 3B has dielectric layers 328, 318 that are directly coupled to the top and bottom plates 320, 310 respectively, rather than the mid-upper element 331 and the mid-lower element 336 respectively. As illustrated in FIG. 3B, the dielectric layers 328, 318 may cover one surface of the top and bottom plates 320, 310 in order to both prevent the masses 331b, 336b from touching the respective top and bottom plates 320, 310 and also to decouple the frame 330a from the top and bottom plates 320, 310.

Figure 3C:
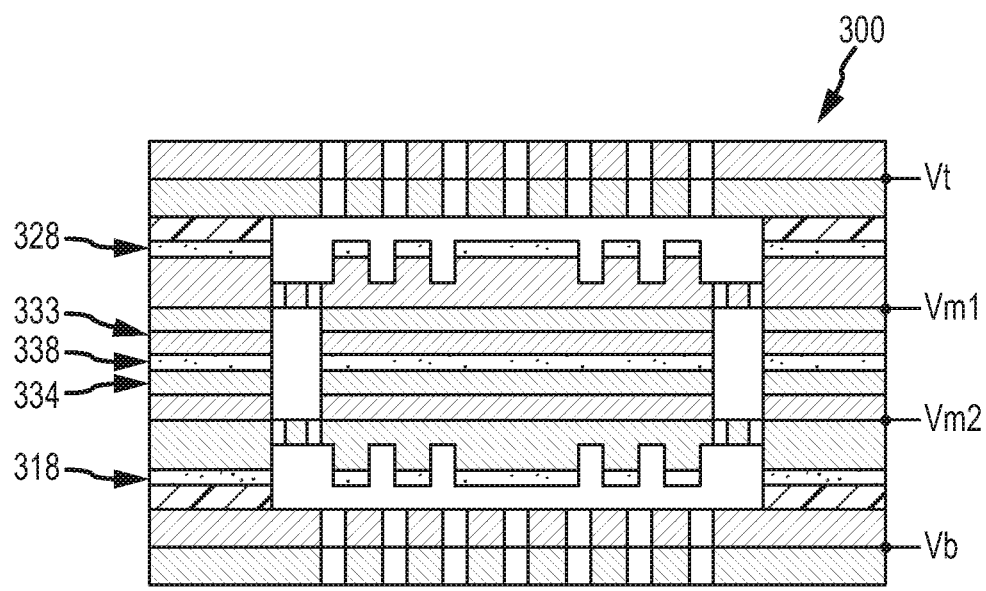
FIG. 3C illustrates a cross-sectional view of another embodiment of a transducer.

FIG. 3C illustrates a cross-section view of a third embodiment of a transducer 300, which may also be similar to the transducer 300 illustrated in FIG. 3A, except that the transducer 300 illustrated in FIG. 3C includes a dielectric layer 338 that is positioned between two of the central elements 333, 334. In this manner, the two capacitances 329, 319 may be decoupled from one another. As such, two electrical connections Vm1 and Vm2 may be made to the middle portion 330 in order to be able to measure electrical signals from the transducer 300.

Figure 4:
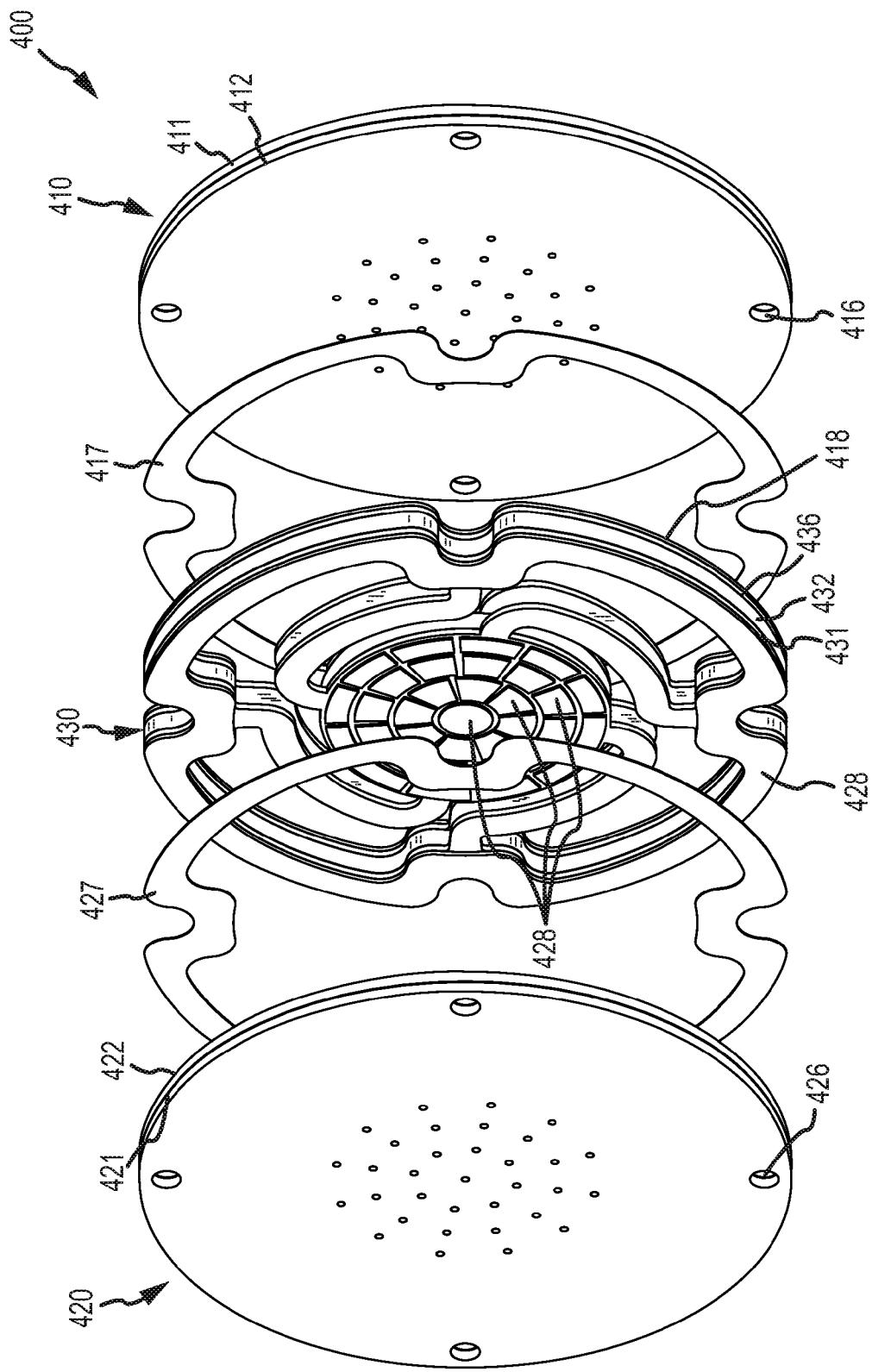
FIG. 4 illustrates a partially exploded perspective view of another embodiment of a transducer.
Figure 4A:
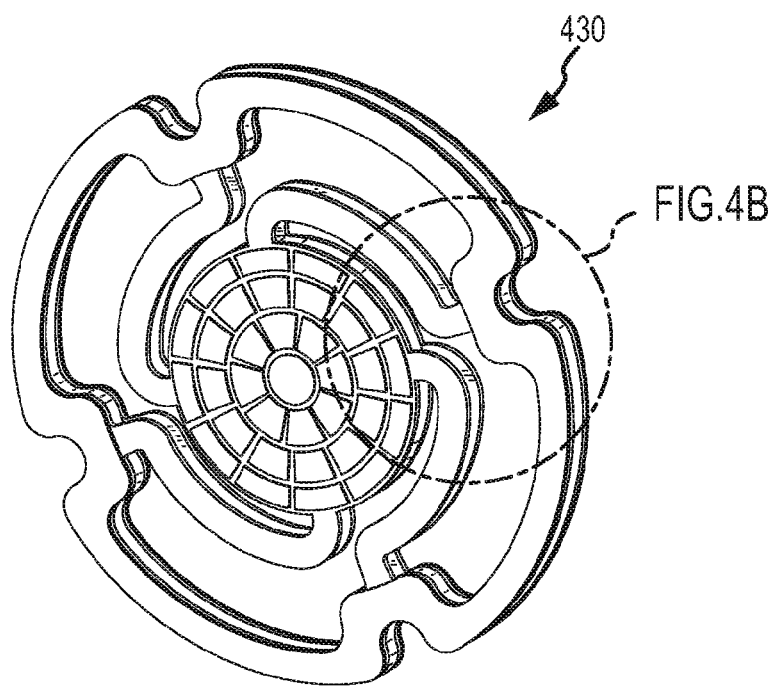
Figure 4B:
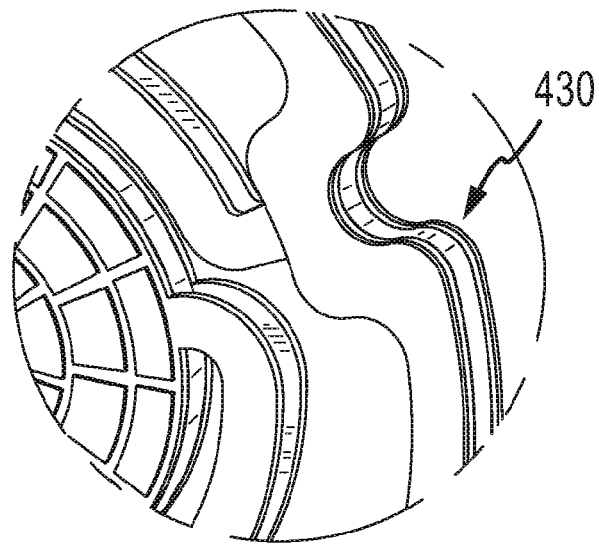

FIG. 4 illustrates an exploded perspective view of a fourth embodiment of a transducer 400, which may be similar to the transducer 300 illustrated in FIG. 3A. The transducer 400 illustrated in FIG. 4 may include a top plate 420 formed from two sheets 421, 422, a bottom plate 410 formed from two sheets 411, 412, a middle portion 430 formed from a mid-upper element 431, a central element 432, and a mid-lower element 436. The middle portion 430, which is also illustrated in FIGS. 4A and 4B, may also include dielectric layers 428, 418. The top plate 420 may be coupled to the middle portion 430 through a bonding layer 427, and the bottom plate 410 may be coupled to the middle portion 430 through another bonding layer 417.

As illustrated in FIG. 4, the top and bottom plates 420, 410 are generally circular in shape, and each include a plurality of perforations 424, 414. The top and bottom plates 420, 410 may also include a plurality of apertures 426, 416 through which a fastener may be placed to secure the transducer 400 to a housing or mounting structure. Also as illustrated in FIG. 4, the middle portion 430 is generally circular in shape and defines a plurality of openings that may receive a fastener placed through the apertures 426, 416 of the top and bottom plates. The mass of the middle portion 430 is also generally circular in shape, and the eight attachment members of the middle portion 430 are curved and generally serpentine-shaped.

Although FIGS. 2 through 4B have illustrated a few embodiments 200, 300, 400 of a transducer, many other embodiments are possible and within the spirit of the present disclosure. For example, although FIGS. 3A through 3B have illustrated a transducer 300 with both a mid-upper element 331 and a mid-lower element 336, a transducer may in some embodiments include a mid-upper element but not a mid-lower element, or may include a mid-lower element but not a mid-upper element. Also, a transducer may include none, one or a plurality of central elements (FIGS. 3A through 3C each illustrate a transducer 300 with four central elements 332, 333, 334, 335, whereas FIG. 4 illustrates a transducer 400 with a single central element 432). Also, as mentioned above, any one or more of the mid-upper element, central element, and/or mid-lower element may include one or more attachment members, even though FIGS. 3 through 4B illustrate only the mid-upper and mid-lower elements having attachment members.

In general, the number, thickness, size, and composition of the components of the middle portion may depend on the application for the transducer's use. For example, if it is desirable for the mass to be very large, more central elements may be included in the middle portion to increase the weight of the mass. Also, a heavier type of material may be used for the central elements (in order to increase the weight of the mass), while a lighter, more flexible type of material may be used for the mid-upper and/or the mid-lower elements (in order to provide more elastic attachment members). Further, the upper and lower capacitances may be weighted asymmetrically such that the same movement in the up and down direction may result in different capacitance measurements. In addition to different sizes of mass, the shape, thickness, width, and so forth, of the attachment members may change depending on the application. For example, the size of the mass and the design of the attachment members may vary depending on a target frequency or frequency range.

Figure 5:
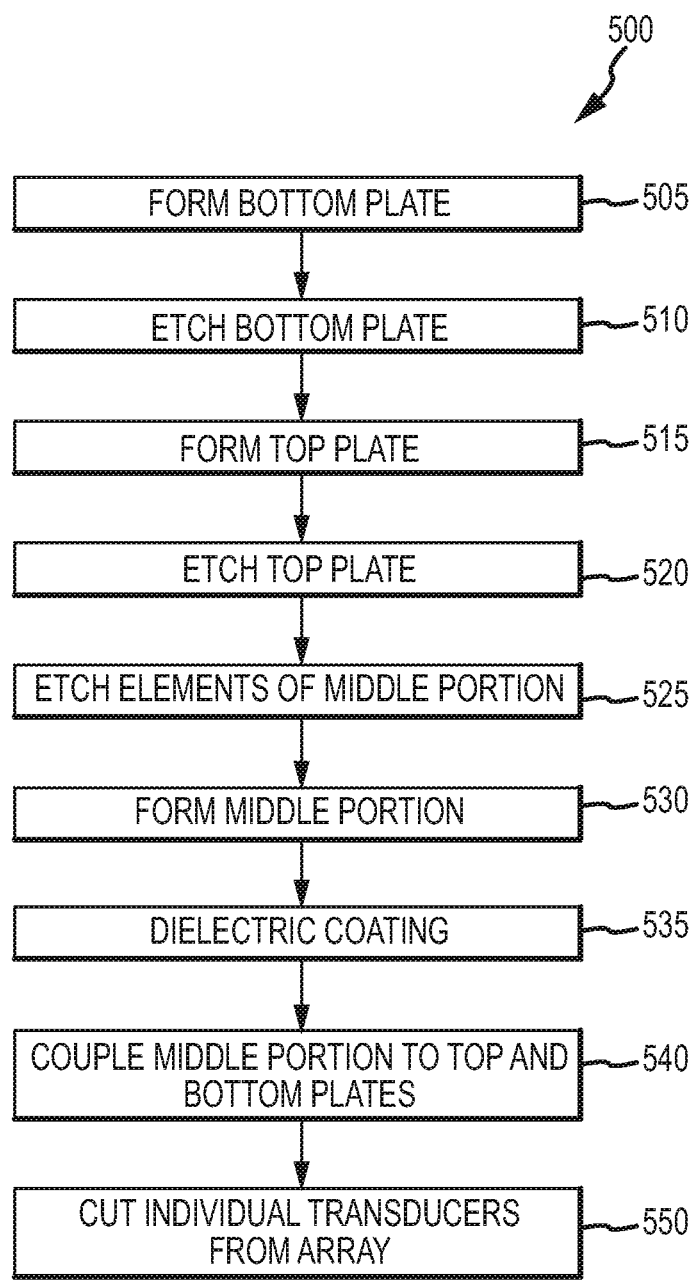
FIG. 5 illustrates one embodiment of a method for manufacturing a transducer.

FIG. 5 illustrates operations 500 that may be used in manufacturing a transducer, such as the transducers 100, 200, 300, 400 described above. In general, the operations 500 may be carried out to manufacture a single transducer, but the operations 500 may also be used in a batch fabrication manufacturing process where, for example, a plurality of bottom plates may be formed from a single sheet or a single stack of a plurality of sheets of material (as described below in more detail), a plurality of top plates may be formed from a single sheet or a single stack of a plurality of sheets of material (as described below in more detail), and/or a plurality of middle portions may be formed from a single sheet or a single stack of a plurality of sheets of material (as described below in more detail). Such a batch fabrication process may allow for a large number of transducers to be manufactured at the same time, thereby further reducing manufacturing costs. For example, a single sheet or a single stack of a plurality of sheets of material may be approximately eleven inches wide by seventeen inches long may be used to form hundreds of top plates/bottom plates/middle portions at the same time. Of course the single sheet or the single stack of a plurality of sheets of material may be much smaller or much larger and be any shape, and the number of top plates/bottom plates/middle portions formed from it may depend on the size of the top plates/bottom plates/middle portions. It should be appreciated that two or more of the operations 500 may be performed at substantially the same time in some implementations.

Beginning with operation 505, a bottom plate is formed (or, as described above, a plurality of bottom plates may be formed together in a batch fabrication process). As described above, the bottom plate may be formed from one or a plurality of sheets of material. In those cases where it is formed from a plurality of sheets of material, the plurality of sheets of material may be coupled together, such as through a bonding or an adhesive process. For example, the plurality of sheets of material may be stacked and aligned and placed under pressure at an elevated temperature in order to create a thermal diffusion bond between the plurality of sheets of material. As also described above, the one or more sheets of material may be metal, and/or ceramic, and so forth. In some cases, such as where one of the sheets of material used to form the bottom plate is ceramic, a conductive layer may be deposited on the ceramic in order to form a capacitive plate. In operation 510, the bottom plate may be etched or otherwise modified. For example, perforations (such as perforations 314 illustrated above in FIG. 3A) may be formed in the bottom plate. The perforations may be etched through photochemical machining, laser cutting/drilling, water jet cutting, micromachining, and so forth. Alternatively, the sheets of material used to form the bottom plate may be "preformed"—for example, the sheets of material may be volume printed as described below in connection with FIGS. 6 and 7.

In operation 515, a top plate is formed (or, as described above, a plurality of top plates may be formed together in a batch fabrication process). As described above, the top plate may be formed from one or a plurality of sheets of material. In those cases where it is formed from a plurality of sheets of material, the plurality of sheets of material may be coupled together, such as through a bonding or an adhesive process. For example, the plurality of sheets of material may be stacked and aligned and placed under pressure at an elevated temperature in order to create a thermal diffusion bond between the plurality of sheets of material. As also described above, the one or more sheets of material may be metal, and/or ceramic, and so forth. In some cases, such as where one of the sheets of material used to form the top plate is ceramic, a conductive layer may be deposited on the ceramic in order to form a capacitive plate. In operation 520, the top plate may be etched or otherwise modified. For example, perforations (such as perforations 324 illustrated above in FIG. 3A) may be formed in the top plate. The perforations may be etched through photochemical machining, laser cutting/drilling, water jet cutting, micromachining, and so forth. Alternatively, the sheets of material used to form the top plate may be "preformed"—for example, the sheets of material may be volume printed as described below in connection with FIGS. 6 and 7.

In operations 525 and 530, the middle portion may be formed by for example etching the middle portion's elements. Apertures made by etching may define the attachment members, the mass, and/or the frame. In order to form the transducer 300 illustrated in FIG. 3A, for example, the mid-upper and mid-lower elements may be etched to define their respective attachment members, masses, and frames, and then the central element or elements may be etched to define their respective masses and frames. In some embodiments, grooves (such as the grooves 331d described above in FIG. 3A) may be etched into the mid-upper and/or mid-lower elements. In some embodiments, the etching may leave tabs that connect the mass to the frame for the central elements and/or for the mid-upper and mid-lower elements. The tabs may keep the masses coupled to the respective frames during the initial stages of manufacturing and can be later disconnected, for example by a non-contact cutting technique such as laser cutting, water jet cutting, and so forth. The tabs may be relatively narrow in some embodiments to allow for relatively quick subsequent disconnection. With continuing reference to FIGS. 3A and 5, the middle portion of the transducer 300 may be formed in operation 530 by coupling the middle portion's elements together. For example, the mid-upper element, the central portion(s), and/or the mid-lower element may be stacked and aligned and placed under pressure at an elevated temperature in order to create a thermal diffusion bond between the elements.

In operation 535, a dielectric coating may be applied to one or more of the top plate, the bottom plate, and the middle portion. For example, with reference to FIG. 3A, a dielectric coating such as parylene may be applied to the middle portion, whereas with reference to FIG. 3B, a dielectric coating may be applied to the top and bottom plates. In general, the dielectric layer may be applied in many different manners, such as through chemical vapor deposition, omni-directional deposition, a deposition bath, an anodizing process (for certain types of materials), and so forth. Note also that the dielectric coating applied in operation 535 may alternatively be applied earlier or later in operations 500. For example, the dielectric coating may be applied before the grooves (e.g., 331d) are etched and/or before the middle portion or the top or bottom plates are formed.

In operation 540, the middle portion may be coupled to the top and bottom plates. For example, an adhesive layer may be positioned between the middle portion and each of the top and bottom plates. The top plate, the first adhesive layer, the middle portion, the second adhesive layer, and the bottom plate may be stacked and aligned and placed under pressure at an elevated temperature to couple the middle element to the top and bottom plates.

For batch fabrication, in operation 550, individual transducers may be cut from the larger array of transducer through, for example, a laser cut, a water jet cut, and so forth.

With reference now to both FIGS. 6A-6E and FIG. 7, another method of manufacturing a transducer 600, similar to the transducers 100, 200, 300, 400 described above, will be described. In general, FIGS. 6A through 6E illustrate different layers that may be volume printed, and FIG. 7 illustrates the operations 700 that may be used in the volume printing process. Volume printing as used herein refers to 3D printing whereby conductive and non-conductive materials can be deposited in a layer-by-layer method of manufacturing. During the volume printing, filler material may be used to fill areas that are to be voids in the final product. During or in between each of the operations 700, the volume printed material or materials may need to be treated, such as being fired or cured.

Figure 6A:
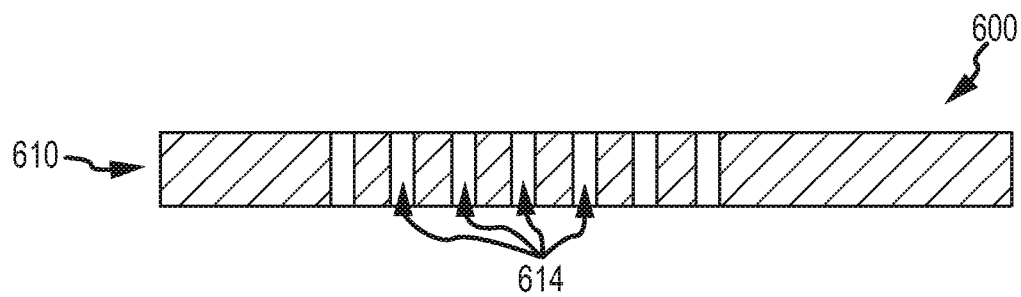
FIGS. 6A through 6E illustrate acts in a manufacturing process for manufacturing a transducer.
Figure 6B:
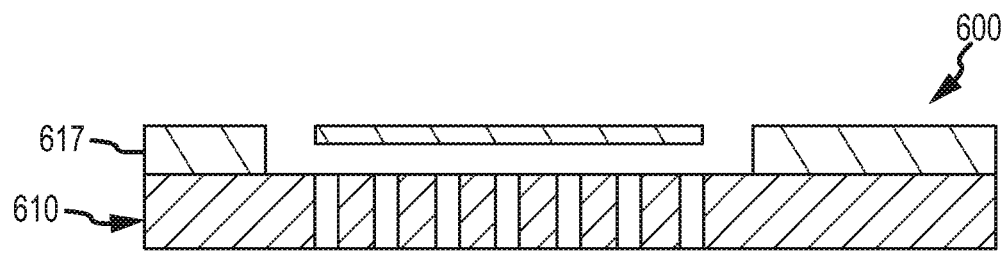
Figure 6C:
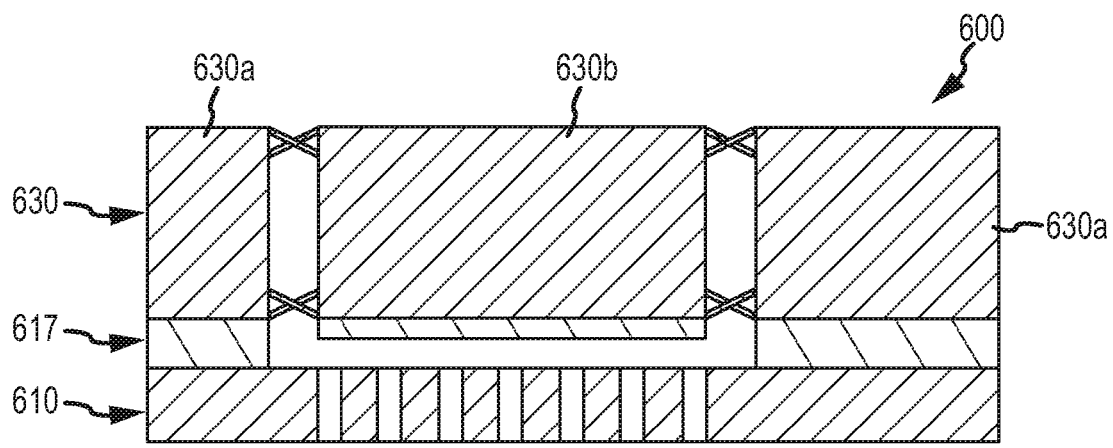
Figure 6D:
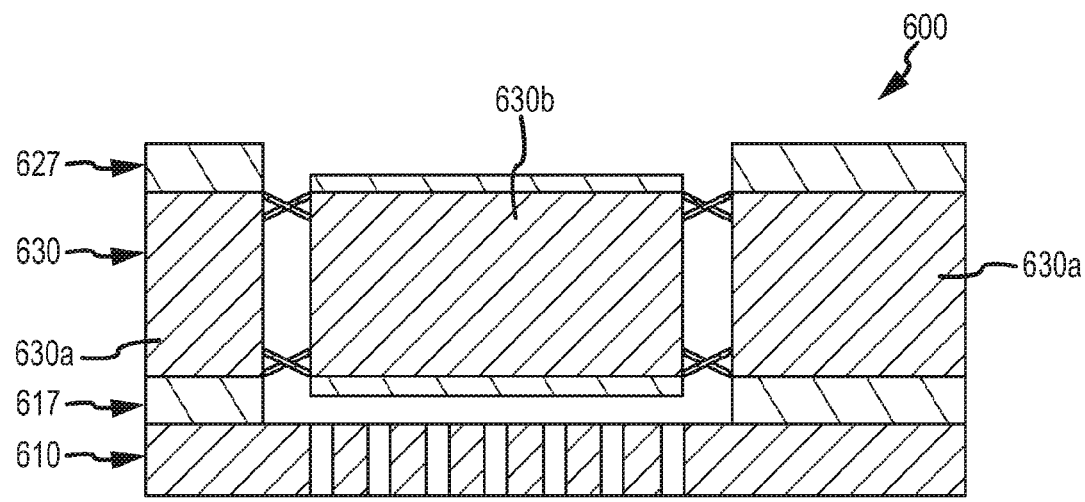
Figure 6E:
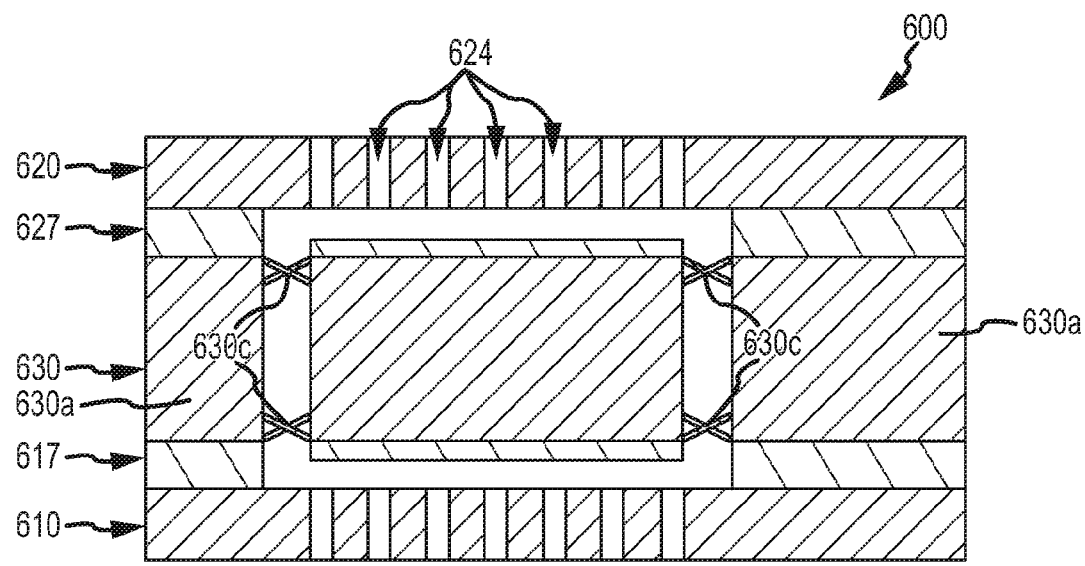
Figure 7:
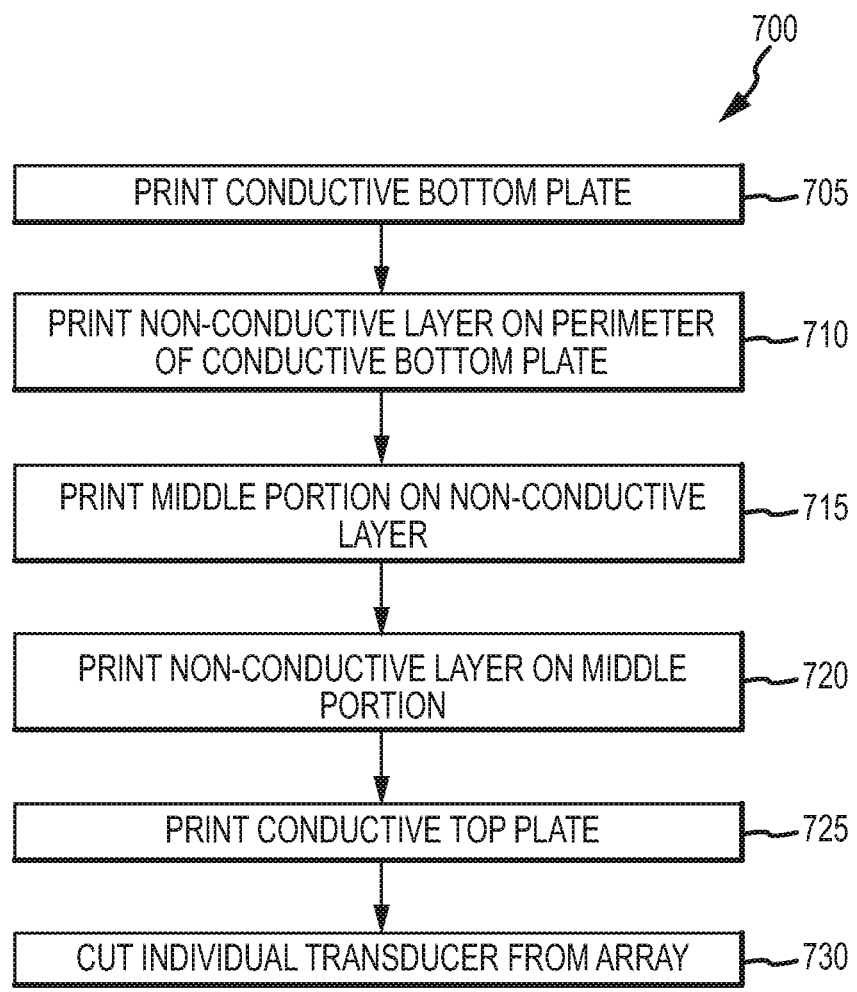
FIG. 7 illustrates a method for manufacturing the transducer illustrated in FIG. 6A through 6E.

With reference to FIG. 6A, in operation 705 a bottom conductive plate 610 may be volume printed. With reference to FIG. 6B, in operation 710 a first non-conductive layer 617 may be volume printed around the perimeter of the conductive bottom plate 610. With reference to FIG. 6C, a middle portion 630 may be volume printed on the first non-conductive layer 617, the middle portion 630 including a frame 630a, a mass 630b, and a plurality of attachment members 630c. With reference to FIG. 6D, a second non-conductive layer 627 may be volume printed around the perimeter of the middle portion 630. With reference to FIG. 6E, a conductive top plate 620 may be volume printed on the second non-conductive layer 627. Each of the layers 610, 617, 630, 627, 620 may in some embodiments include a plurality of thinner layers. For example, each layer may include a few to several hundred thinner layers, with each thinner layer being, for example, between 5 um to 500 um in some embodiments, although the thinner layers may of course be thinner or thicker than 5 um and 500 um in some embodiments. Also, each of the thinner layers and/or each of the layers 610, 617, 630, 627, 620 may include bonding material to help coupled the surfaces of the layers 610, 617, 630, 627, 620 together.

Because volume printing involves printing or depositing materials layer-by-layer, a variety of features can be volume printed that may be difficult in other methods of manufacture. For example, the attachment members can be made to be a 3D spring-like structure (rather than a 2D serpentine-like structure), which may allow for more elastic or otherwise different attachment members to be formed. Also, insulative vias can be volume printed through one or more layers to allow for particular electrical connections (e.g., an electrical connection can be made directly to the mass instead of indirectly through the frame of the middle portion). Also, because the volume printing only volume prints material where needed (e.g., no structural material is printed in areas that are to be voids in the finished product—instead filler material may be "printed" or may be provided before the printing), no etching or other subsequent modifications may be needed.

Although FIGS. 6A through 7 illustrate a method of manufacturing a transducer or an array of transducers by volume printing, many different types of transducers can be made by volume printing. As just a few examples, an additional dielectric layer could be printed within the middle portion (see FIG. 3C), and/or grooves could be formed on the top and the bottom of the middle portion. Many other features may or may not be included in a volume printed transducer.

Figure 8:
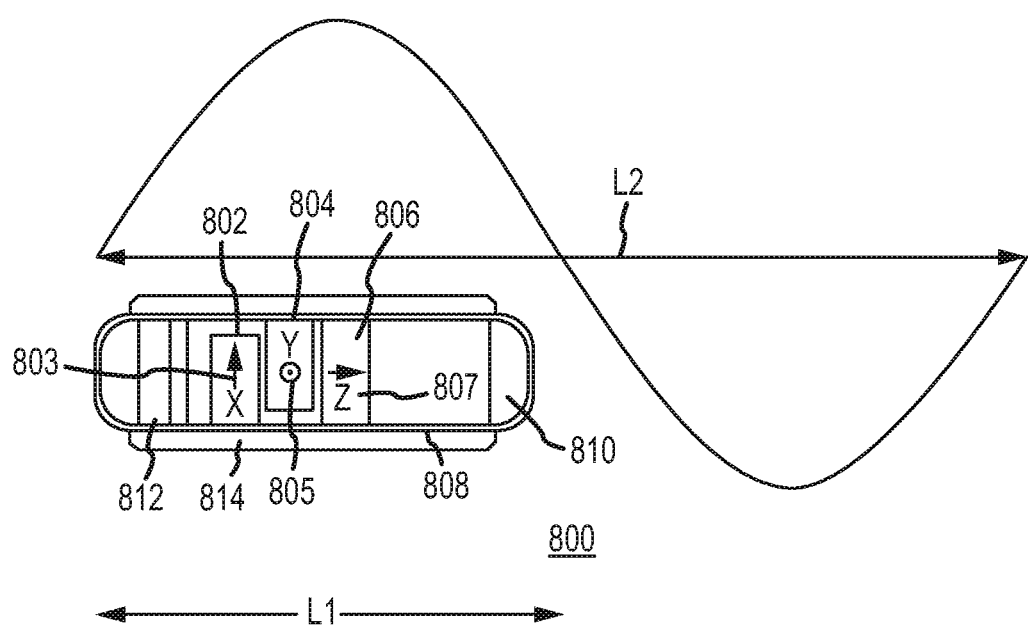
FIG. 8 illustrates a cross-sectional view of one embodiment of a packaged seismic receiver.

FIG. 8 illustrates one embodiment of a packaged seismic receiver 800 that includes multiple transducers 802, 804, 806 that together can be used as a tri-axial accelerometer. The transducers 802, 804, 806 may be similar to those previously described with respect to prior embodiments. As is shown, each of the transducers 802, 804, 806 may be mounted to an enclosed housing 808 that contains all of the transducers 802, 804, 806. Additionally, the receiver 800 may further include other components, such as a hydrophone 810 or other sensing device configured to measure acoustic pressure, as well as an electronic conditioner 812, such as a voltage measurement device or an amplifier that is coupled to transducers 802, 804, 806. In some embodiments, the housing 808 may be fully or partially covered by a foam material 814 or other low-density material that does not add significant weight to the receiver 800. In one embodiment, the foam material 814 may be syntactic foam.

As is shown, the transducers 802, 804, 806 may each be configured to sense acoustic particle acceleration applied in different directions 803, 805, 807. For example, the transducers 802, 804, 806 may be oriented such that they are substantially orthogonal to one another. In one embodiment, the transducers 802, 804, 806 may be oriented substantially orthogonally to one another, such that the transducers 802, 804, 806 may sense acoustic particle acceleration in the X, Y, and Z directions 803, 805, 807, as shown in FIG. 8. In other embodiments, the transducers 802, 804, 806 may be oriented at other angles relative to one another.

In some embodiments, the receiver 800 may include a relatively large amount of void space within the housing to affect its buoyancy. For example, in one particular embodiment, the equivalent density of the receiver 800 may be less than or equal to approximately five (5) times the density of water so that the receiver 900 can follow the acoustic particle velocity. The buoyancy of the receiver 800 may be further increased by the foam 814 surrounding the housing 808. Additionally, as shown, the receiver 800 may have a length L1 that is less than or equal to approximately half of the wavelength L2 of the upper bound frequency of an acoustic wave.

During operation, the receiver 800 may be displaced by acoustic waves moving through the water, such that the receiver 800 follows the movement of the acoustic waves. The transducers 802, 804, 806 may each be configured to sense the amount of acoustic acceleration (i.e., velocity) of the receiver 800 as it moves in the water in one directional component 803, 805, or 807 (e.g., X, Y, or Z). Other embodiments may include more or fewer transducers 802, 804, 806, such that the receiver 800 may be capable of sensing acoustic acceleration in more or fewer directions.

FIG. 9 illustrates an embodiment of a computer system 935 capable of processing the data from one or more transducers or receivers to determine, for example, the acoustic acceleration of a body in at least one directional component. The transducer(s) may be similar to any of the embodiments described and shown above. In some embodiments, the computer system 935 may be a personal computer and/or a handheld electronic device aboard the vessel 101 (shown in FIG. 1). In other embodiments, the computer system 935 may be an implementation of enterprise level computers, such as one or more blade-type servers within an enterprise in a land-based computer system. A keyboard 940 and mouse 941 may be coupled to the computer system 935 via a system bus 948. The keyboard 940 and the mouse 941, in one example, may introduce user input to the computer system 935 and communicate that user input to a processor 943. Other suitable input devices may be used in addition to, or in place of, the mouse 941 and the keyboard 940. An input/output unit 949 (I/O) coupled to the system bus 948 represents such I/O elements as a printer, audio/video (A/V) I/O, etc.

Computer 935 also may include a video memory 944, a main memory 945 and a mass storage 942, all coupled to the system bus 948 along with the keyboard 940, the mouse 941 and the processor 943. The mass storage 942 may include both fixed and removable media, such as magnetic, optical or magnetic optical storage systems and any other available mass storage technology. The bus 948 may contain, for example, address lines for addressing the video memory 944 or the main memory 945.

The system bus 948 also may include a data bus for transferring data between and among the components, such as the processor 943, the main memory 945, the video memory 944 and the mass storage 942. The video memory 944 may be a dual-ported video random access memory. One port of the video memory 944, in one example, is coupled to a video amplifier 946, which is used to drive a monitor 947. The monitor 947 may be any type of monitor suitable for displaying graphic images, such as a cathode ray tube monitor (CRT), flat panel, or liquid crystal display (LCD) monitor or any other suitable data presentation device.

The computer system includes a processor 943, which may be any suitable microprocessor or microcomputer. The computer system 935 also may include a communication interface 950 coupled to the bus 948. The communication interface 950 provides a two-way data communication coupling via a network link. For example, the communication interface 950 may be a satellite link, a local area network (LAN) card, a cable modem, and/or wireless interface. In any such implementation, the communication interface 950 sends and receives electrical, electromagnetic or optical signals that carry digital data streams representing various types of information.

Code received by the computer system 935 may be executed by the processor 943 as the code is received, and/or stored in the mass storage 942, or other non-volatile storage for later execution. In this manner, the computer system 935 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices. Regardless of the actual implementation of the computer system 935, the data processing system may execute operations that allow for the filtering using repeatability and other metrics.

While the embodiments described above are primarily described in connection with detecting seismic energy, a person of skill in the art will appreciate that these embodiments may also be used for other purposes. For example, the disclosed transducers may be used to measure vehicle acceleration, vibration on cars, machines, buildings, process control systems, safety installations, and so on. Additionally, the disclosed transducers may be used in smartphones, digital audio players, and other electronic devices utilizing transducers to determine the orientation of the device relative to the user. A person of skill in the art will further appreciate that the disclosed transducers may have a multitude of applications associated with other types of transducers, including, but not limited to, applications in engineering, biology, industry, medicine, transportation, navigation, and gravimetry. Furthermore, a person of skill in the art will appreciate that as described above, the transducers described herein may be used as sensors, but they may also or alternatively be used as actuators where a voltage is applied to in order to actuate the mass of the middle portion.

The apparatuses and associated methods in accordance with the present disclosure have been described with reference to particular embodiments thereof in order to illustrate the principles of operation. The above description is thus by way of illustration and not by way of limitation. Various modifications and alterations to the described embodiments will be apparent to a person of skill in the art in view of the teachings herein. For example, under the teachings of the present disclosure a person of skill in the art may be able to devise numerous systems, arrangements and methods which, although not explicitly shown or described herein, embody the principles described and are thus within the spirit and scope of this disclosure. Accordingly, it is intended that all such alterations, variations, and modifications of the disclosed embodiments are within the scope of this disclosure as defined by the appended claims.

In addition, in methodologies directly or indirectly set forth herein, various steps and operations may be described in one possible order of operation, but those skilled in the art will recognize that the steps and operations may be rearranged, replaced, or eliminated without necessarily departing from the spirit and scope of the disclosed embodiments.

All relative and directional references (including: upper, lower, upward, downward, upgoing, downgoing, left, right, top, bottom, side, above, below, front, middle, back, vertical, horizontal, middle, and so forth) are given by way of example to aid the reader's understanding of the particular embodiments described herein. They should not be read to be requirements or limitations, particularly as to the position, orientation, or use of the invention. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

What is claimed is:

1. A method of forming a transducer comprising the acts of:
   forming a structural bottom plate from a first sheet of metal material;
   forming a structural top plate from a second sheet of metal material;
   forming a middle portion comprising a mid-upper element and a central element, including the acts of:
      forming the mid-upper element from a third sheet of material, the mid-upper element comprising a mid-upper frame, a mid-upper mass, and a plurality of mid-upper attachment members coupling the mid-upper mass to the mid-upper frame;
      forming the central element from a fourth sheet of material, the central element comprising a central frame and a central mass;
      coupling the mid-upper mass and the central mass together to form a combined mass; and
      coupling the mid-upper frame and the central frame together to form a combined frame;
   coupling the combined frame to the top plate such that a first capacitance is provided between the combined mass and the top plate; and
   coupling the combined frame to the bottom plate such that a second capacitance is provided between the combined mass and the bottom plate.

2. The method of claim 1, further comprising the acts of:
   forming a mid-lower element from a fifth sheet of material, the mid-lower element comprising a mid-lower frame, a mid-lower mass, and a plurality of mid-lower attachment members coupling the mid-lower mass to the mid-lower frame;
   bonding the mid-lower mass, the central mass, and the mid-upper mass to form the combined mass; and bonding the mid-lower frame, the central frame, and the mid-upper frame to form the combined frame.

3. The method of claim 1, wherein the third sheet of material is a third sheet of metal material and the fourth sheet of material is a fourth sheet of metal material.

4. The method of claim 1, wherein one or more of the first and second sheets of metal material comprises stainless steel.

5. The method of claim 1, further comprising the acts of:
   forming a plurality of bottom plates from the first sheet of metal material;
   forming a plurality of top plates from the second sheet of metal material; and
   forming a plurality of middle portions from the third sheet of material.

6. The method of claim 1, wherein the bottom plate is formed from a plurality of sheets of material, the bottom plate is formed by bonding the plurality of sheets of material together, and the bonding includes thermal bonding.

7. The method of claim 1, wherein the combined frame provides at least part of a casing for the transducer and the structural top and bottom plates form part of the casing.

8. The method of claim 1, wherein a first surface of the combined frame is coupled to the top plate through a first dielectric layer and a second surface of the combined frame is coupled to the bottom plate through a second dielectric layer, and wherein the first and second dielectric layers are formed by plating the first and second surfaces of the combined frame with a dielectric material.

9. The method of claim 1, wherein a first dielectric layer and a second dielectric layer are formed on the top and bottom plates respectively, and the combined mass is also plated with a dielectric material.

10. The method of claim 1, wherein the bottom plate is formed by etching a first plurality of perforations on the first sheet of metal material and the top plate is formed by etching a second plurality of perforations on the second sheet of metal material.

11. A transducer, comprising:
    a bottom plate formed from a first sheet of non-semiconductor material;
    a top plate formed from a second sheet of non-semiconductor material; and
    a middle portion, the middle portion comprising: a mid-upper element formed from a third sheet of material, the mid-upper element comprising a mid-upper frame, a mid-upper mass, and a plurality of mid-upper attachment members coupling the mid-upper mass to the mid-upper frame; and
    a central element formed from a fourth sheet of material, the central element comprising a central frame and a central mass,
    wherein the mid-upper mass and the central mass are coupled together to form a combined mass, the mid-upper frame and the central frame are coupled together to form a combined frame, the combined frame is coupled to the top plate such that a first capacitance is provided between the combined mass and the top plate, and the combined frame is coupled to the bottom plate such that a second capacitance is provided between the combined mass and the bottom plate.

12. The transducer of claim 11, wherein the bottom plate, the top plate, and the middle portion together form a first accelerometer, further comprising a second accelerometer and a third accelerometer, the first, second, and third accelerometers mounted in a housing and together forming a vector sensor.

13. A method of forming a transducer comprising the acts of:
    forming a structural bottom plate from a first sheet of metal material;
    forming a structural top plate from a second sheet of metal material, wherein the top and bottom plates form part of a casing for the transducer;
    forming a middle portion from a third sheet of material, the middle portion comprising:
       a frame with first and second surfaces;
       a mass with first and second surfaces; and
       a plurality of attachment members coupling the mass to the frame;
    coupling the first surface of the frame to the top plate such that a first capacitance is provided between the mass and the top plate; and
    coupling the second surface of the frame to the bottom plate such that a second capacitance is provided between the mass and the bottom plate.

14. The method of claim 13, wherein the middle portion is formed by etching a plurality of apertures in the third sheet of material, the plurality of apertures defining the plurality of attachment members.

15. The method of claim 14, wherein the etching includes photochemical machining.

16. The method of claim 14, wherein the middle portion is formed by etching a plurality of grooves on the third sheet of material.

17. The method of claim 13, wherein the top and bottom plates are conductive and further comprising the acts of:
  volume printing the first sheet of metal material forming the conductive bottom plate;
  volume printing a first non-conductive layer on a perimeter of the conductive bottom plate;
  volume printing the third sheet of material forming the middle portion on the first non-conductive layer, the middle portion further comprising:
    the frame coupled to the perimeter of the conductive bottom plate;
  volume printing a second non-conductive layer on the frame; and
  volume printing the second sheet of metal material forming the conductive top plate on the second non-conductive layer;
  wherein the first capacitance is provided between the conductive bottom plate and the mass and the second capacitance is provided between the conductive top plate and the mass.

18. The method of claim 17, wherein the acts of printing do not include any etching.

19. The method of claim 17, wherein the middle portion comprises a conductive layer.

20. The method of claim 19, wherein the middle portion comprises two conductive layers and a non-conductive middle layer and the plurality of attachment members comprise 3D springs.

21. The method of claim 19, wherein at least one of the acts of volume printing includes printing an insulative via.

* * * * *